(12) United States Patent
Fedele

(10) Patent No.: US 9,565,966 B2
(45) Date of Patent: Feb. 14, 2017

(54) COFFEE FILTER QUALIFICATION APPARATUS AND METHODOLOGY

(75) Inventor: Vincent Fedele, Harvard, MA (US)

(73) Assignee: Voice Systems Technology, Inc., Harvard, MA (US)

( * ) Notice: Subject to any disclaimer, the term of this patent is extended or adjusted under 35 U.S.C. 154(b) by 0 days.

(21) Appl. No.: 12/915,004

(22) Filed: Oct. 28, 2010

(65) Prior Publication Data

US 2012/0105622 A1    May 3, 2012

(51) Int. Cl.
*H04N 7/18* (2006.01)
*A47J 31/06* (2006.01)

(52) U.S. Cl.
CPC .................. *A47J 31/0663* (2013.01)

(58) Field of Classification Search
CPC .................................... A47J 31/0663
USPC .......................................... 348/92
See application file for complete search history.

(56) References Cited

U.S. PATENT DOCUMENTS

| | | | | |
|---|---|---|---|---|
| 5,745,168 A | * | 4/1998 | Ninomiya | 348/191 |
| 2004/0235271 A1 | * | 11/2004 | Nakajyo et al. | 438/460 |
| 2005/0082370 A1 | * | 4/2005 | Frantz et al. | 235/462.25 |
| 2006/0102011 A1 | * | 5/2006 | Po Fung | 99/279 |
| 2007/0109524 A1 | * | 5/2007 | Kawakubo et al. | 355/77 |
| 2007/0199643 A1 | * | 8/2007 | Kawai et al. | 156/89.22 |
| 2007/0238191 A1 | * | 10/2007 | Gargano et al. | 436/164 |
| 2007/0259153 A1 | * | 11/2007 | Noguchi et al. | 428/116 |
| 2007/0276629 A1 | * | 11/2007 | Koonankeil | 702/185 |
| 2009/0129699 A1 | * | 5/2009 | Beikirch et al. | 382/279 |
| 2010/0045975 A1 | * | 2/2010 | Zoeller, III | 356/239.2 |

* cited by examiner

*Primary Examiner* — Allen Wong
(74) *Attorney, Agent, or Firm* — Mark P Kahler

(57) ABSTRACT

A coffee filter qualification system receives user-specified filter criteria relating to acceptable attributes for a plurality of apertures included in a liquid brewing filter. A light source illuminates the apertures of the liquid brewing filter and a machine vision camera images the apertures of the filter. A filter qualification information handling system (IHS) determines if the liquid brewing filter meets the predefined user-specified filter criteria. The filter qualification IHS accepts the liquid brewing filter if the filter meets the filter criteria, and otherwise rejects the filter. The filter criteria may include the total cumulative area of the apertures, individual aperture area, aperture count and aperture acircularity information.

46 Claims, 16 Drawing Sheets

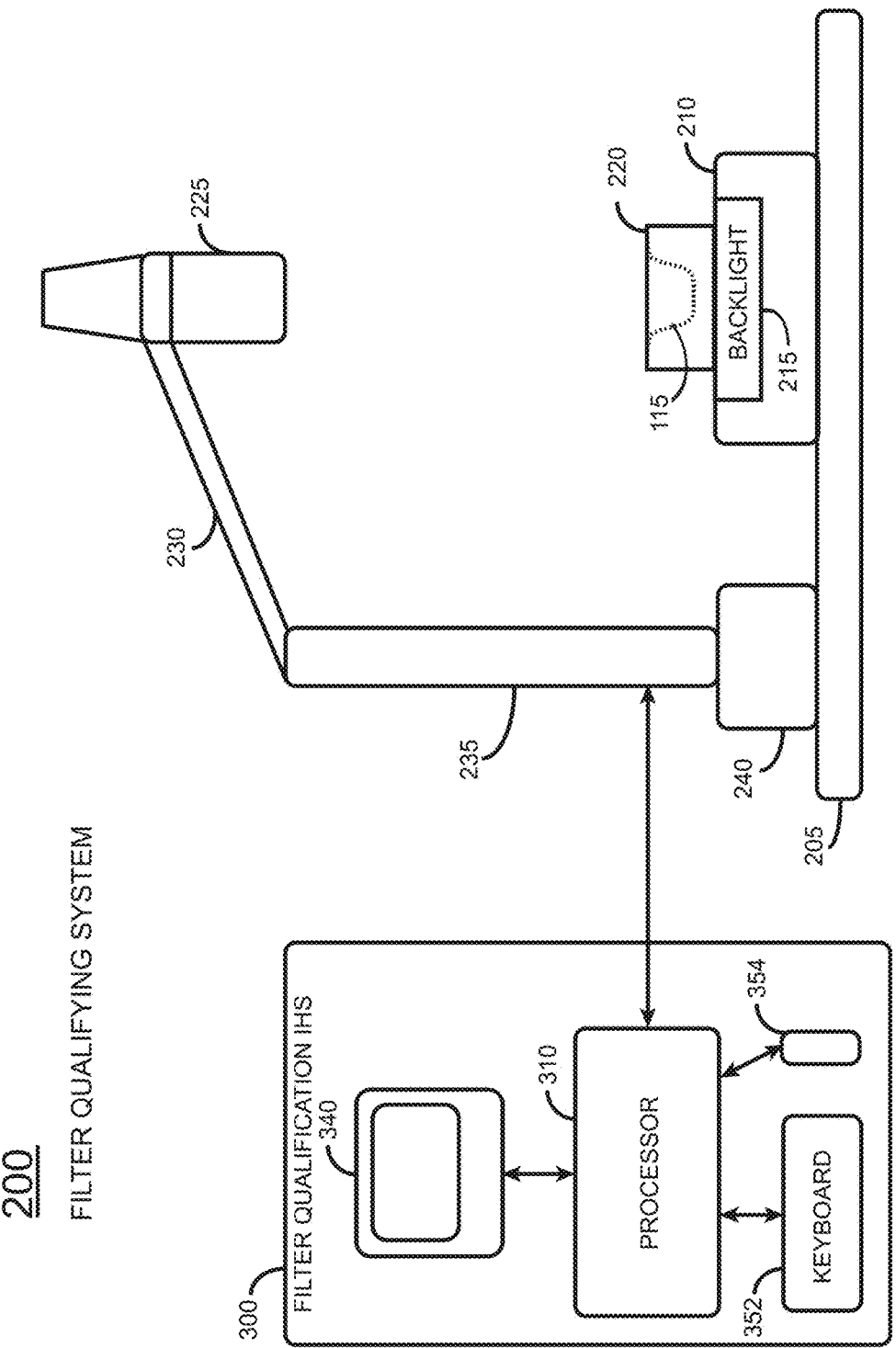

300
FILTER QUALIFICATION IHS

FAIL

FAIL

FAIL

PASS

PASS

FIG. 6

PART PARAMETERS

PART SELECTION

PART NAME — 610
[ABC1 ▼]

[NEW PART] — 605

VISION SETTINGS

STRAINER HEIGHT (mm) — 610 [23.0]
AREA BIN SIZE (mm) — 615 [0.001]
EXPECTED HOLE COUNT — 620 [632]
FREE PASSAGE AREA (sq mm) — 625 [54.0]

PASS/FAIL CRITERIA

|  | MIN | MAX | FAIL % |
|---|---|---|---|
| ACIRCULARITY — 640 | 0.90 | 1.10 | 5.0 |
| HOLE AREA — 645 | 0.075 | 0.110 | 5.0 |
| HOLE COUNT — 650 | 632 | | |
| TOTAL AREA — 655 | 49.0 | 65.0 | |
| AVG DIAMETER — 657 | 230.0 | 270.0 | |
| QUALITY — 660 | 90.0 | | |

| | VALUE | ALLOWED FAILURES |
|---|---|---|
| MIN AREA LIMIT | 0.070 — 665 | 0 — 667 |
| MAX AREA LIMIT | 0.100 — 670 | 0 — 672 |

| INTERVALS | AREA BINS | RAW AREA | RAW DIAMETER | RAW ACIRCULARITY |
|---|---|---|---|---|
| 0.000-0.005 | 0 | 0.1024149 | 0.361107577 | 1.043739935 |
| 0.005-0.010 | 0 | 0.1006318 | 0.359750285 | 0.964230008 |
| 0.010-0.015 | 0 | 0.0990495 | 0.35512497 | 0.982258691 |
| 0.015-0.020 | 0 | 0.0988984 | 0.354854022 | 0.950373713 |
| 0.020-0.025 | 0 | 0.099675 | 0.356244594 | 0.986051387 |
| 0.025-0.030 | 0 | 0.0988518 | 0.354770348 | 0.952896893 |
| 0.030-0.035 | 0 | 0.098041 | 0.353312466 | 0.954731569 |
| 0.035-0.040 | 0 | 0.0976681 | 0.352639973 | 1.016349948 |
| 0.040-0.045 | 0 | 0.0981738 | 0.353551592 | 1.017511403 |
| 0.045-0.050 | 0 | 0.0975332 | 0.352396208 | 1.020725633 |
| 0.050-0.055 | 0 | 0.096491 | 0.350508478 | 1.000135311 |
| 0.055-0.060 | 0 | 0.097662 | 0.352628842 | 0.968172619 |
| 0.060-0.065 | 0 | 0.0988451 | 0.354758405 | 1.068973125 |
| 0.065-0.070 | 0 | 0.0961227 | 0.349838896 | 0.997721276 |
| 0.070-0.075 | 1 | 0.0991155 | 0.355243327 | 1.035792571 |
| 0.075-0.080 | 4 | 0.0977237 | 0.352740304 | 1.011135195 |
| 0.080-0.085 | 128 | 0.0964514 | 0.350436565 | 1.011815988 |
| 0.085-0.090 | 349 | 0.096996 | 0.351424414 | 1.014522011 |
| 0.090-0.095 | 211 | 0.0978377 | 0.352946002 | 1.015418441 |
| 0.095-0.100 | 20 | 0.0982964 | 0.35377225 | 1.044350832 |
| 0.100-0.105 | 2 | 0.0945395 | 0.346945881 | 0.983355579 |

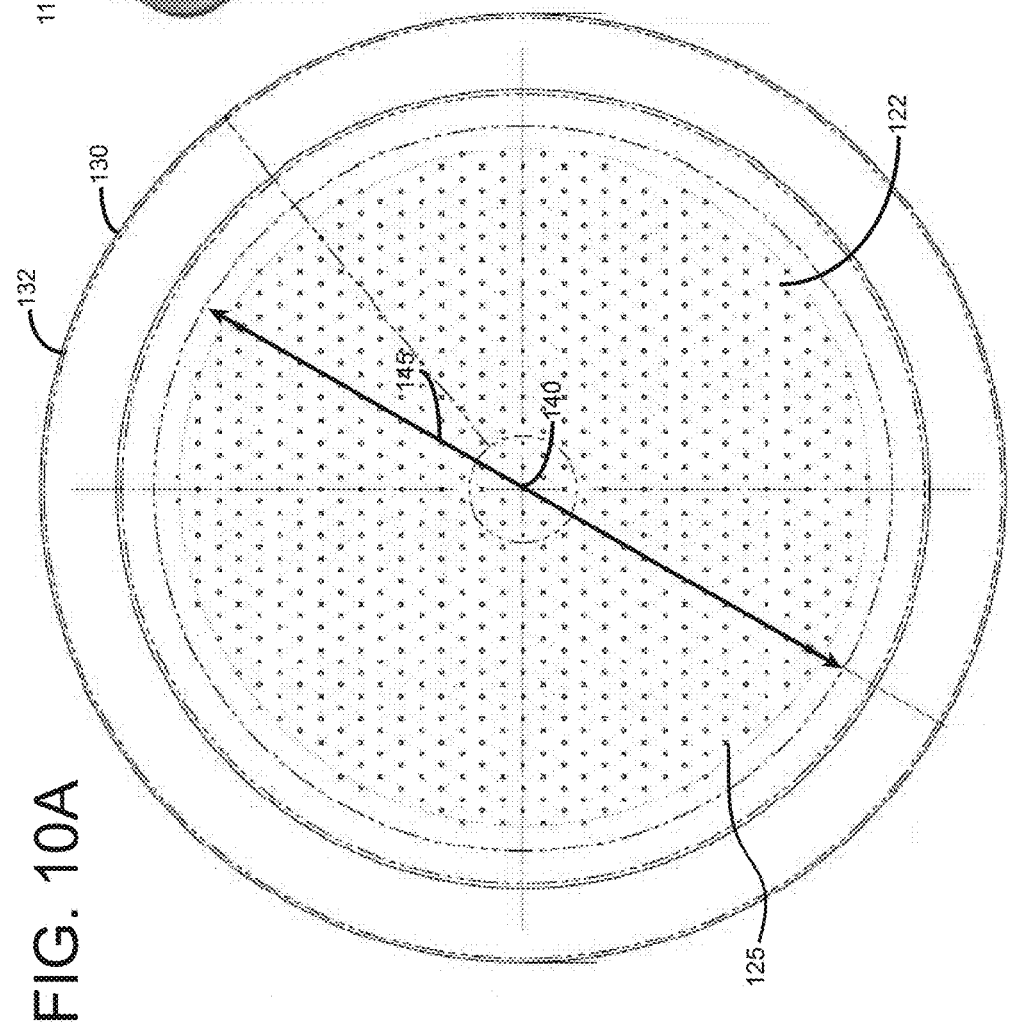
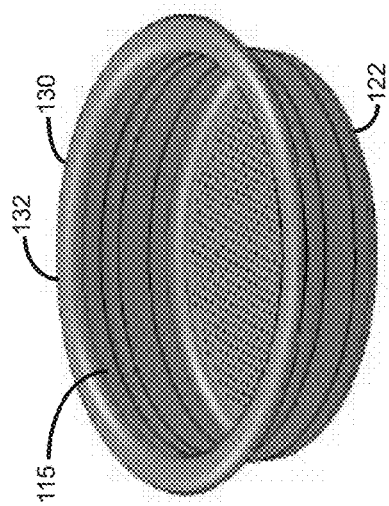
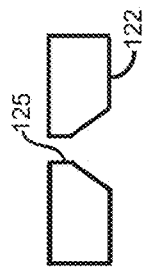
FIG. 10A
FIG. 10B
FIG. 10C

COFFEE FILTER QUALIFICATION APPARATUS AND METHODOLOGY

TECHNICAL FIELD OF THE INVENTION

The disclosures herein relate generally to brewing liquids, and more particularly to the filters used in brewing beverages such as coffee and espresso.

BACKGROUND

Quality standards in the specialty coffee industry established during the 1950's and 1960's state that coffee extraction of approximately 20% (usually a range of ~18-22%) will achieve the best quality brewed coffee, using various brew methods. Over the ensuing years these established standards have been generally referred to as the gold-cup standard, and have been accepted internationally by many institutions, educational establishments, and standards committees. The precise extraction (solubles yield) and strength (solubles concentration) may be varied for particular coffees, to achieve finely tuned recipes for particular coffee cultivars, climates and growing regions, also known as terroir, and other characteristics.

Extraction (solubles yield) refers to the percentage of the dry coffee by weight that is removed by dissolving in water during the brewing process. Up to 30% of the available soluble solids in ground coffee can be extracted, with most of the remaining 70% being cellulose, and not soluble in water. However, generally speaking, extracting more than 22% will begin to sharply increase those components in coffee that contribute to bitter taste defects associated with over-extraction. Extracting less than 18% is generally associated with weak, under-developed taste defects often associated with sour taste defects, especially at higher concentrations, such as with espresso.

The finished brew is a balance between extraction (solubles yield) served at the desired strength (solubles concentration). Over-extracting, which results in taste defects known as bitter, can be known as strong-bitter at higher concentrations, or weak bitter at lower concentrations. Similarly, under-extracting, which results in taste defects known as sour or under-developed, can be known as strong-under-developed at higher concentrations, or weak under-developed at lower concentrations. The highest quality coffee will have rich aroma, fullness of body, delicacy of flavor as well as clarity and unique character—all optimally balanced. Achieving these attributes requires a significant degree of precision during the coffee brewing process.

Strength (solubles concentration) refers to the measured amount of solids extracted into the final coffee solution. Strength may be expressed as the percentage total dissolved solids (% TDS). For example, for 100 grams of a coffee measuring 8.5% TDS, there are 91.5 grams of water, and 8.5 grams of dissolved coffee solids in solution.

To brew coffee, such as espresso, a specific dose of selected ground coffee is uniformly distributed and tamped into an espresso basket filter. Water heated to a predetermined temperature and pressure is injected through the coffee basket filter while the shot of espresso coffee is brewed into a cup or other vessel. In order to obtain maximum sweetness, aroma, body and flavor it is desirable for the barista or other user to be able to consistently pull shot after shot of high quality coffee with uniform concentration and extraction yield.

SUMMARY

Accordingly, in one embodiment, a method of qualifying liquid brewing filters is provided. The method includes providing, to a filter qualification information handling system (IHS), filter criteria relating to a plurality of apertures included in a liquid brewing filter. The method also includes illuminating, by a light source, the plurality of apertures in the liquid brewing filter. The method further includes imaging, by a machine vision camera, the liquid brewing filter to generate an image including the plurality of apertures of the liquid brewing filter. The method still further includes determining, by the filter qualification IHS, if the liquid brewing filter meets the filter criteria. The method also includes accepting, by the filter qualification IHS, the liquid brewing filter if the filter meets the filter criteria. The filter criteria may include the total cumulative area of the apertures, individual aperture area, aperture count and aperture acircularity information.

In another embodiment, a liquid brewing filter qualifying system is disclosed. The system includes a filter qualification information handling system (IHS) that receives filter criteria relating to a plurality of apertures included in a liquid brewing filter. The system also includes a light source that illuminates the plurality of apertures of the liquid brewing filter. The system further includes a machine vision camera, coupled to the filter qualification IHS, that images the liquid brewing filter to generate an image including the plurality of apertures of the liquid brewing filter. The filter qualification IHS determines if the liquid brewing filter meets the filter criteria and accepts the liquid brewing filter if the filter meets the filter criteria.

In yet another embodiment, a computer program product is provided. The computer program product includes a computer readable storage medium. The computer program product includes first program instructions that receive filter criteria relating to a plurality of apertures included in a liquid brewing filter. The computer program product also includes second program instructions that instruct a light source to illuminate the plurality of apertures in the liquid brewing filter. The computer program product further includes third program instructions that instruct a machine vision camera to image the liquid brewing filter to generate an image including the plurality of apertures of the liquid brewing filter. The computer program product still further includes fourth program instructions that determine if the liquid brewing filter meets the filter criteria. The computer program product also includes fifth program instructions that accept the liquid brewing filter if the filter meets the filter criteria. The first, second, third, fourth and fifth instructions are stored on the computer readable storage medium.

BRIEF DESCRIPTION OF THE DRAWINGS

The appended drawings illustrate only exemplary embodiments of the invention and therefore do not limit its scope, because the inventive concepts lend themselves to other equally effective embodiments.

FIG. 2 is a block diagram of the disclosed filter qualification apparatus.

FIG. 6 is an input parameter screen shot that the disclosed filter evaluation application may generate on a display to enable the user to provide filter criteria for filter testing and qualification purposes.

FIG. 9C shows further additional information that may be added to the report of FIG. 9A and 9B to provide a more detailed report.

FIG. 10A is a bottom view of a coffee filter fabricated by micro-machining the aperture area of the filter.

FIG. 10B is a perspective view of the filter of FIG. 10A.

FIG. 10C is a representation of a cross section of an aperture of the filter of FIGS. 10A and 10B.

DETAILED DESCRIPTION

Figure 1A:
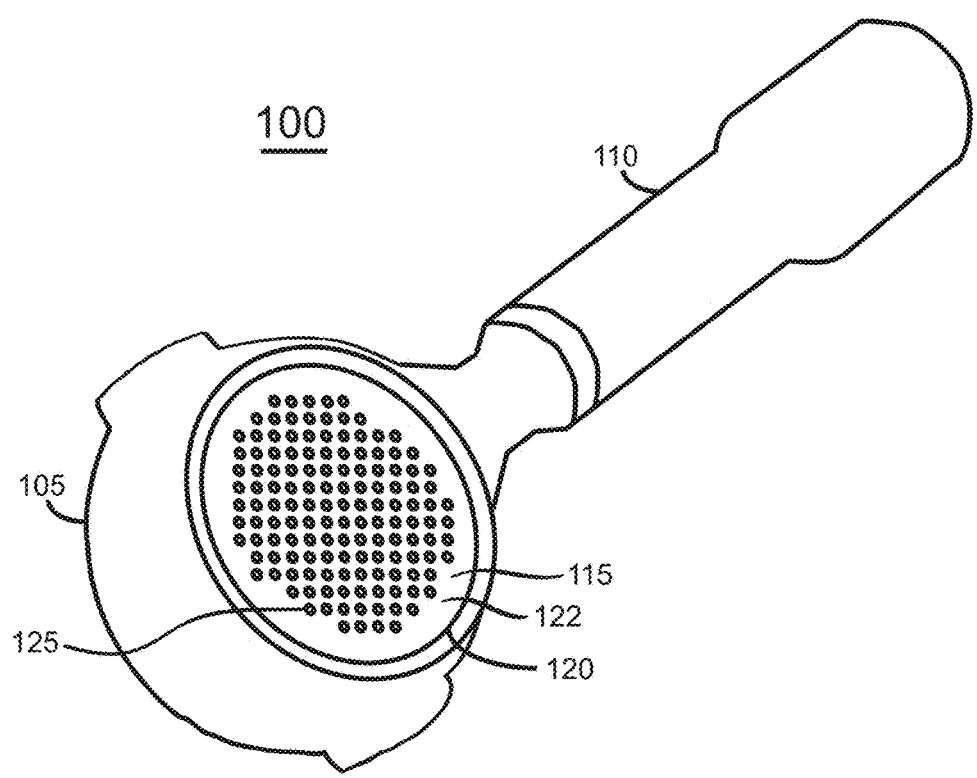
FIG. 1A is a perspective view of a typical porta-filter assembly that is depicted holding the disclosed removable liquid brewing filter that may be tested and qualified in accordance with the disclosed filter qualification apparatus and methodology.
Figure 1B:
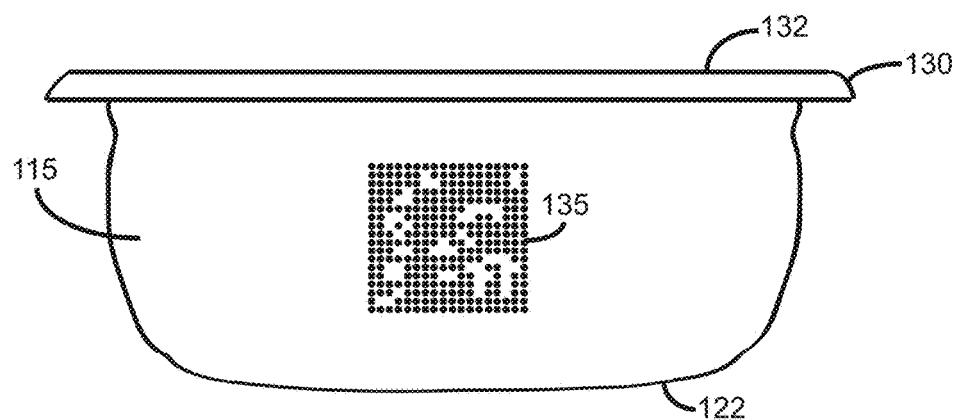
FIG. 1B is a side view of the disclosed removable liquid brewing filter of FIG. 1A including a unique marking code.

FIG. 1A is a perspective view of a filter assembly 100 that includes a porta-filter holder 105 attached to a handle 110. The disclosed filter 115 is retained in holder 105. In FIG. 1A, a bottom portion 122 of filter 115 is visible through an opening 120 in the bottom of filter holder 105. Filter assembly 100 may be placed in a brewing apparatus such as a coffee brewing machine or espresso machine when brewing is desired. Super Automatic espresso machines use a filter similar to filter 115, of different shape and size, without an external filter assembly 100. Such a brewing machine forces heated water at a predetermined temperature and pressure through a puck of coffee placed in filter 115. The liquid exiting filter 115 is the resultant brewed beverage. As seen in FIG. 1B, filter 115 may be cup-shaped to enable filter 115 to hold the puck of coffee. Filter 115 and filter holder 105 may be fabricated from metal such as food grade stainless steel, AISI 304 or similar. Filter 115 may also be referred to as an espresso coffee basket or porta filter basket. The bottom 122 of filter 115 includes multiple apertures or holes 125 through which the brewed liquid flows. Filter 115 may include hundreds of apertures 125, the number of apertures depending on the cross-sectional area of each aperture and the particular coffee brewing application. In this particular embodiment, filter 115 includes a rim 130 at top 132 of filter 115, as well as a retaining ridge to hold the filter firmly in the porta filter handle assembly. Filter assembly 105 may also be referred to as a porta-filter.

FIG. 2 shows the disclosed coffee basket qualification system 200 that may be used to critically test and evaluate the acceptability of a particular coffee filter 120 for brewing purposes. It has been found that the lack of uniformity in coffee basket filters, particular with respect to the size and geometry of the holes of the filter, can cause considerable difficulty when attempting to brew espresso coffee uniformly and consistently cup-to-cup at similar concentrations and extraction yields. This inconsistency may occur even when using filters of the same type and model due to significant variations from filter to filter. The flow of liquid through a coffee filter is determined by a number of factors. For example, the particle size and amount of coffee in the filter both impact the liquid flow rate through the filter. Tamping, water pressure, temperature and overall gicleur size also impact flow rates. These factors are under the control of the machine manufacturer, barista or other user. However, a number other factors, not in control of the user, also impact the liquid flow rate and ultimately may have a dramatic impact on the resultant brew, such as the overall size, shape, uniformity and quantity of the filter holes.

It has been found that some coffee filters, even when new, may include burrs and other occlusions of the holes in the filter. It is also possible that defective holes may be come clogged (fail to clear) with coffee sediments during use over an extended period of time. These inconsistencies affect the flow rate of brewed liquid through the filter and thus impact the quality of the resultant brewed liquid. For example, if a coffee filter is designed with holes exhibiting a diameter of 600 microns and the total cumulative area of the holes is designed to be 60 $mm^2$, but due to fabrication defects, the actual filters exhibiting a total cumulative area of 30 $mm^2$ are going to significantly reduce flow, and produce undesired results. The typical result is that a user will adjust the grade of grind, making the coffee more coarse, in order to restore flow to normal. However, making the coffee more coarse causes significant under-extraction, and sour taste defects. Improper machining may result in some or all holes being too small or too large, or some holes be occluded or partially occluded with undesired metallic materials left by the faulty manufacturing process.

Many brewing machines may have multiple brewing stations, or groups, each with their own filter assembly 100. During normal use, the filter assemblies 100 may be swapped randomly into any available group head position. Since each porta filter assembly 100 includes its own unique filter 115, different filters may be returned to different group positions in the machine. It has been found that unless the filters within these filter assemblies are uniform in terms of total hole cumulative area and hole geometry that the resultant brewed coffee will exhibit highly inconsistent quality from shot to shot, because the primary adjustment will be that of changing grind. Since most users rely on a single high quality grinder, it may frequently be set for one filter, and not work for another filter, thus resulting in poor consistency, frequent trial and error and wasted coffee product and efficiency. If the barista or other user observes that the brewed liquid flows through the filter too quickly, then the barista may try to compensate by grinding the coffee finer. If the barista observes that the brewed liquid is flowing through the filter too slowly, then the barista may attempt to compensate by grinding the coffee more coarsely. Either approach is likely to cause the resultant brewed liquid to exhibit unacceptable qualities, such as sweetness or sourness because the true problem of filter inconsistency is not being appreciated or understood. Considerable time and coffee product is wasted as an operator struggles to keep each position dialed-in, due to each filter requiring a different grind setting. If the intent is to have similar filters in all group positions, all 14 gram capacity filters, for example, then it is crucial they perform similarly in order for the finished beverage to be the same from shot to shot, regardless of which filter is used in which position.

FIG. 2 is a representation of the disclosed filter qualifying system 200. Filter qualifying system 200 images a coffee filter 115 and tests the coffee filter to determine if it meets predetermined test standards including hole circularity and total cumulative hole area. When a group or production run of coffee filters exhibits the same hole circularity and the same total cumulative hole area, then these filters will perform similarly under the same brewing conditions (grind, time, temperature, pressure, and gicleur opening). The total cumulative hole area significantly impacts the flow of brewed liquid through the filter. Imaging system 200 employs very high resolution sub-pixel technology to image the apertures of the filter. In one embodiment, imaging system 200 is capable of resolution within the range of 5-25 microns per pixel. Filter qualifying system 200 includes an optical bench 205. A work piece base 210 including a light source 215 is situated on optical bench 205 at a predetermined location. A filter holder 220 is situated on top of backlight 215 at a predetermined location. Filter holder 220 can be used either manually as single unit filters or as an automated feed system designed to deliver hundreds of filters per minute. Filter holder 220 positions and holds filter 115 in proper alignment as shown (filter 115 shown in dashed lines) during imaging. A high resolution, sub-pixel machine vision imaging camera 225 is positioned above filter 115 in a position enabling camera 225 to digitally image each filter 115. Camera 225 is mounted to optical bench 205 via flexible arm 230, column 235 and pedestal 240, as shown.

A filter qualification information handling system (IHS) 300 couples to camera 225 by wire or wirelessly to control the imaging of filter 115 and to receive a high resolution digital image of the photographed filter 115 from camera 225. Image IHS 300 includes a processor 310 that couples to a display 340. User input devices, such as keyboard 352 and pointing device 354, couple to processor 310. More detail with respect to filter qualification IHS 300 is shown in FIG. 3.

Figure 3:
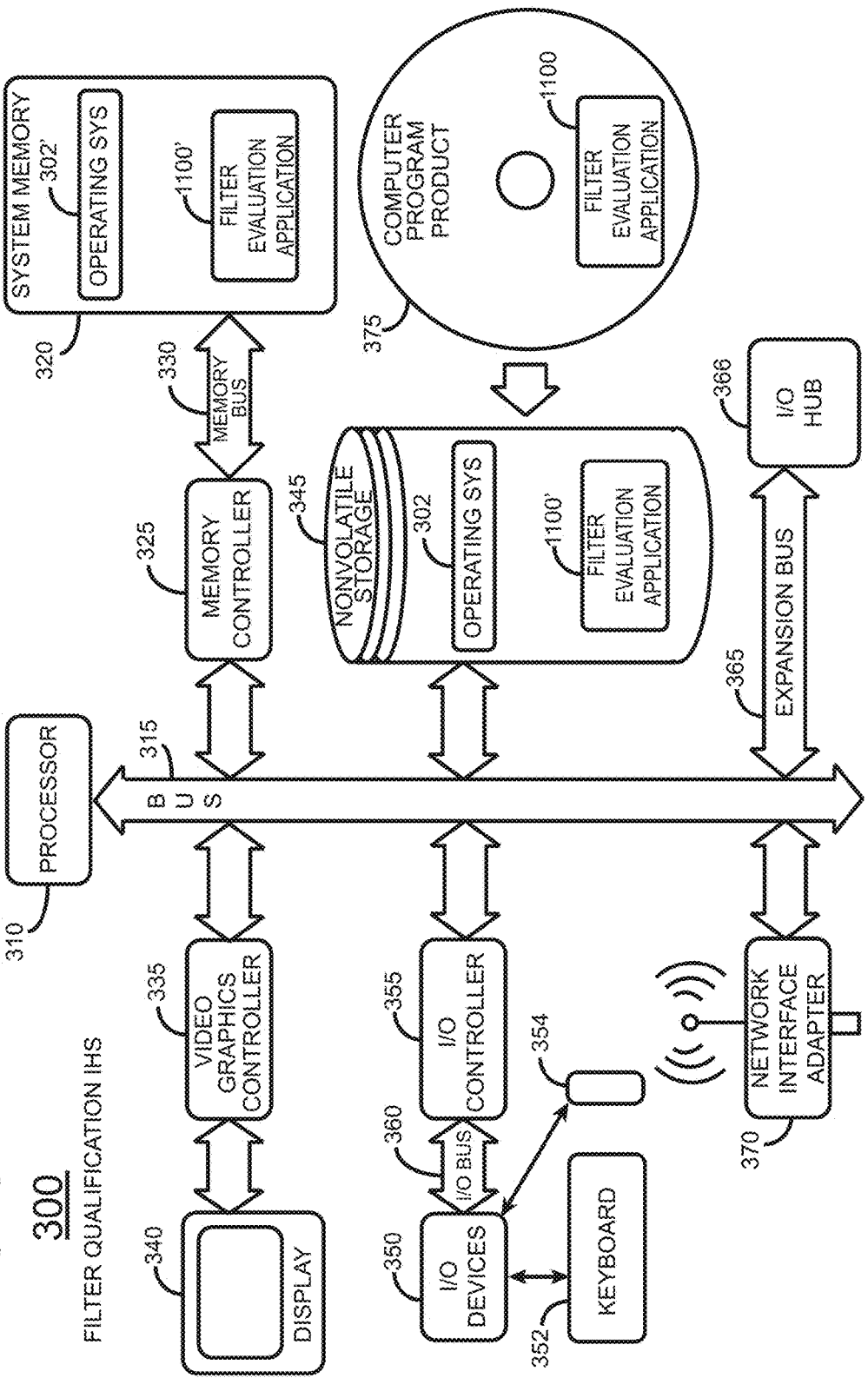
FIG. 3 is a block diagram of a filter qualification information handling system (IHS) that the disclosed filter qualification apparatus may employ. The system may be fixed or portable.

FIG. 3 is a block diagram of an IHS that may be used as filter qualification IHS 300. IHS 300 includes a filter evaluation application 1100 that programs and configures IHS 300 to control imaging camera 225 when it images filter 115. Filter evaluation application 1100 also programs and configures IHS 300 to evaluate filter image information received from imaging camera 225 to determine those particular filters that meet predetermined filter criteria. In this manner, IHS 200 may sort and separate those filters that pass the criteria from those filters that fail the criteria.

Filter qualification IHS 300 includes a processor 310 that may include multiple cores. IHS 100 processes, transfers, communicates, modifies, stores or otherwise handles information in digital form, analog form or other form. IHS 100 includes a bus 315 that couples processor 310 to system memory 320 via a memory controller 325 and memory bus 330. In one embodiment, system memory 320 is external to processor 310. System memory 320 may be a static random access memory (SRAM) array or a dynamic random access memory (DRAM) array. Processor 310 may also include local memory (not shown) such as L1 and L2 caches (not shown). A video graphics controller 335 couples display 340 to bus 315. IHS 300 presents a graphical user interface (GUI) 300 to the user on display 340. Nonvolatile storage 345, such as a hard disk drive, CD drive, DVD drive, or other nonvolatile storage couples to bus 315 to provide IHS 300 with permanent storage of information. I/O devices 350, such as a keyboard 352 and a mouse pointing device 354, couple to bus 315 via I/O controller 355 and I/O bus 360.

One or more expansion busses 365, such as USB, IEEE 1394 bus, ATA, SATA, PCI, PCIE, DVI, HDMI and other busses, couple to bus 315 to facilitate the connection of peripherals and devices to IHS 300. An input/output hub 366, such as a USB hub, couples other devices (not shown) to expansion bus 365. A network interface adapter 370 couples to bus 315 to enable IHS 300, acting as a local communication device, to connect by wire or wirelessly to other IHSs and/or machine vision imaging camera 225. In this embodiment, network interface adapter 370 may also be called a network communication adapter, a network adapter, or communication hardware. While FIG. 3 shows one IHS that employs processor 310, the IHS may take many forms. For example, IHS 300 may take the form of a desktop, server, portable, laptop, notebook, netbook, tablet or other form factor computer or data processing system. IHS 300 may take still other form factors such as a gaming device, a personal digital assistant (PDA), a portable telephone device, a communication device or other devices that include a processor and memory.

IHS 300 includes a computer program product, namely filter evaluation application 1100, on digital media 375 such as a CD, DVD or other media. In one embodiment, a designer, manufacturer, user or other entity installs filter evaluation application 1100 on nonvolatile storage 345 to practice the disclosed filter evaluation and qualification methodology. In practice, IHS 300 may store an operating system 302 (OPERATING SYS) and filter evaluation application 1100 on nonvolatile storage 345 as operating system 302 and filter evaluation application 1100', respectively. When IHS 300 initializes, the IHS loads operating system 302 into system memory 320 for execution as operating system 302'. IHS 100 also loads filter evaluation application 1100' into system memory 320 as filter evaluation application 1100".

Figure 4A:
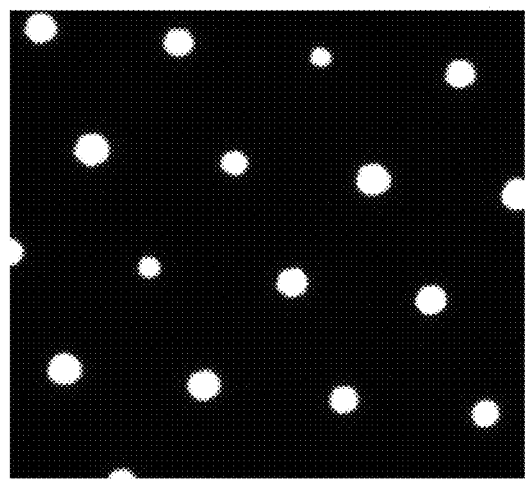
FIG. 4A-4E show images of portions of the apertures of different filters, some of which conform to predefined criteria for aperture size and uniformity and others of which fail those criteria.
Figure 4B:
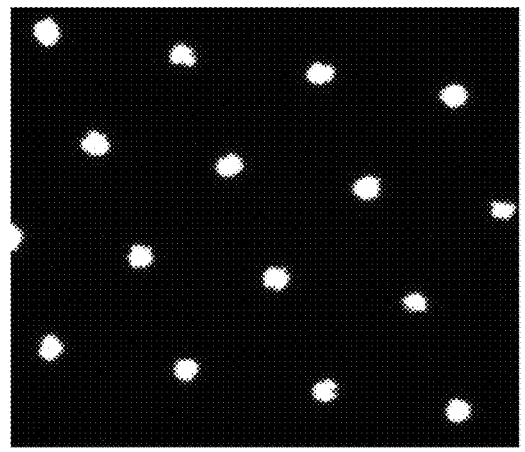
Figure 4C:
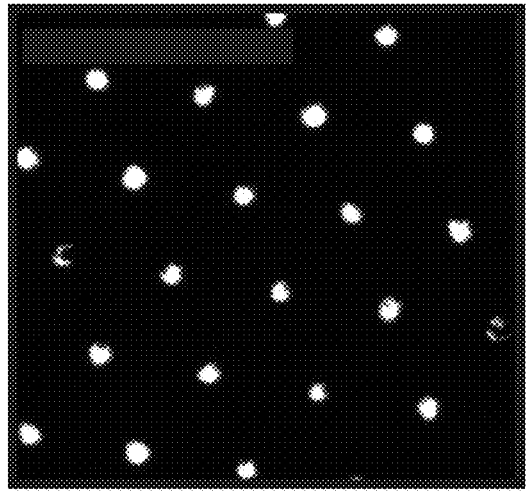
Figure 4D:
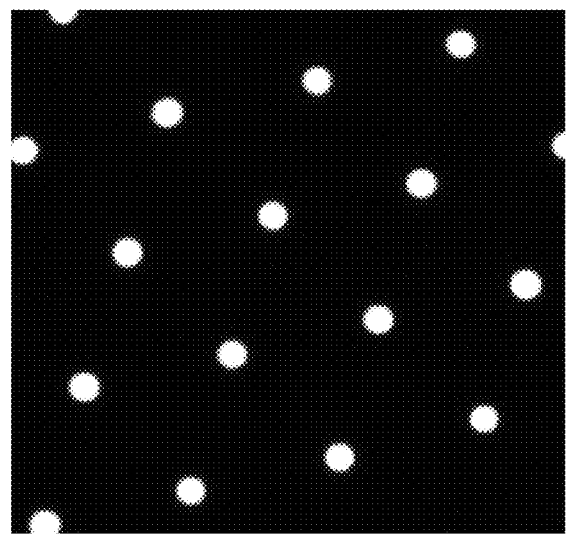
Figure 4E:
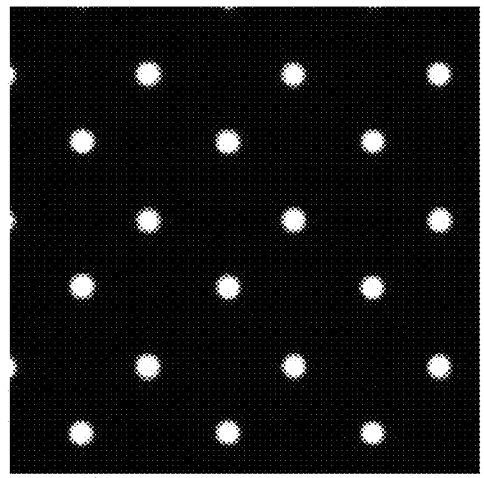

FIG. 4A-4E show images of portions of the apertures of different filters, some of which conform to predefined criteria for aperture size and uniformity and others of which fail these criteria. These images are derived from the output of imaging camera 225 that is provided to filter qualification IHS 300 in digital form. FIG. 4A is an image of a portion of a filter with inconsistent hole size. Some hole diameters are relatively large while other hole diameters are relatively small. Many of these hole diameters substantially vary from a predefined hole diameter criteria and thus fail to qualify as acceptable filters. FIG. 4B is an image of a portion of a filter wherein some of the holes exhibit partial occluding with burrs from the filter machining process. These filters fail to qualify as acceptable filters because they exhibit hole non-uniformity, non-circularity, and/or insufficient total square area. FIG. 4C is an image of a portion of a filter wherein some of the holes exhibit substantial occlusion and are blocked by burrs from the filter machining process. These filters fail to qualify as acceptable filters because they exhibit substantial hole non-uniformity, non-circularity, and/or insufficient total square area. FIG. 4D is an image of a portion of acceptable filter that meets and passes predetermined criteria for hole circularity and hole area. FIG. 4E is an image of a portion of another acceptable filter that meets criteria for a different hole circularity and hole area associated with a different filter model.

Figure 5A:
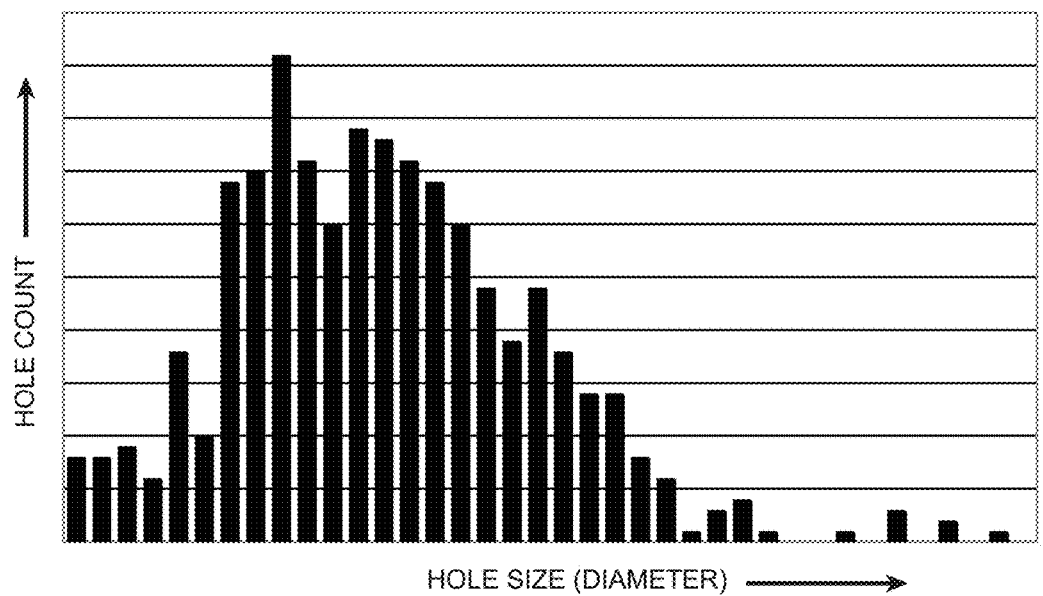
FIG. 5A-5B show histograms respectively of a filter with a wide distribution of aperture or hole size and a filter with a more desirable narrow distribution of aperture or hole size.
Figure 5B:
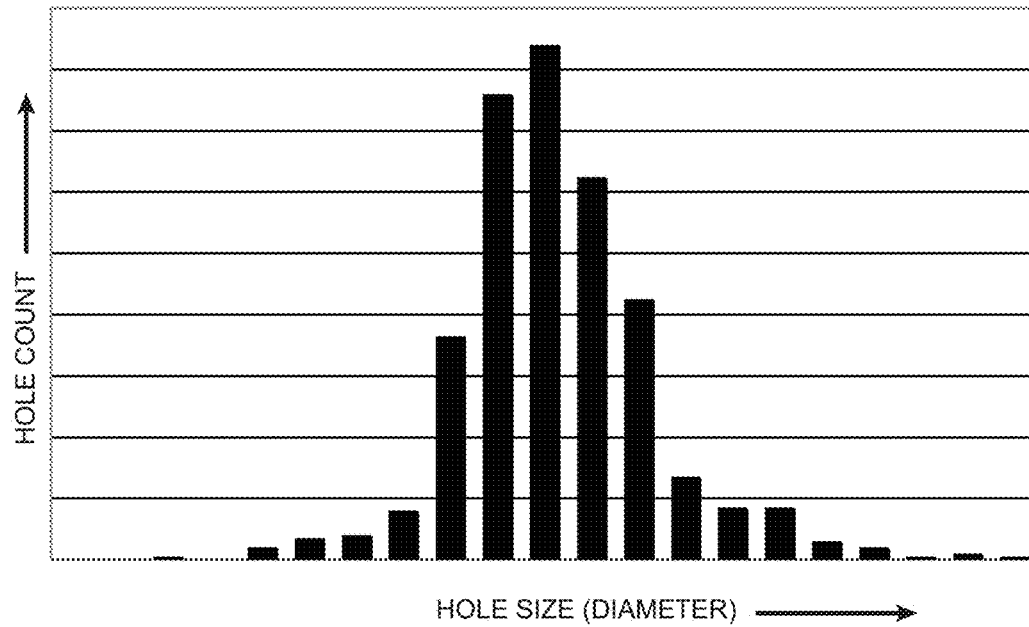

FIG. 5A is a histogram that filter qualifying system 200 may generate to depict how closely a particular filter conforms to a predetermined criteria for hole size or diameter. In an ideal filter, all holes would exhibit the same diameter with uniform circularity. As seen in FIG. 5A, this particular histogram represents a filter that exhibits a broad range of diameters that would be expected to perform poorly, or in a difficult to predict manner. Filter qualifying system 200 may employ input parameters or criteria that instruct system 200 to reject such a filter as unacceptable. FIG. 5B shows a histogram for a particular filter that exhibits a much narrower distribution of hole size, thus conforming more closely to the criteria for a desirable filter than the filter of FIG. 5A. Filter qualifying system 200 may employ input parameters that instruct system 200 to pass such a filter as acceptable. The multiple input parameters or user-specified criteria to which a filter should conform to be an acceptable filter in system 200 are discussed in more detail below.

FIG. 6 is a screen shot of a parameter input screen 600 that filter evaluation application 1100 generates on display 340 to enable a user to input filter parameters and criteria to filter qualification IHS 300. To provide parameters for a new part, previously not provided to IHS 300, a user selects NEW PART box 605. If test parameters for a part under test were previously input to IHS 300, then the user may access those parameters by selecting that part name in PART NAME box 610.

Assuming that the user previously provided input filter parameters for a part named "ABC1" to filter qualification IHS 300, the user may recall those settings by selecting ABC1 in PART NAME box 610. The parameters that were input include STRAINER HEIGHT, namely the height of filter 115 as measured from the bottom of the filter where holes 125 are located to the top of rim 130. Input parameters also include AREA BIN SIZE. AREA BIN SIZE is the hole class size interval for use with a histogram for evaluating range of hole sizes, and may be specified in diameter or area. The EXPECTED HOLE COUNT is another input parameter. EXPECTED HOLE COUNT is the expected number of holes in the particular filter under test. If the expected count is 500 and this criteria is set to 499, then one blocked hole is allowed. FREE PASSAGE AREA 625 is an input parameter that refers to the total desired cumulative area for all holes of the particular filter summed together.

Other input parameters that define an acceptable filter include a number of PASS/FAIL CRITERIA seen in the rightmost portion of parameter input screen 600. For example, an ACIRCULARITY parameter 640 refers to the amount of acceptable acircularity, or non-circularity, that each hole may exhibit. ACIRCULARITY parameter 640 includes selectable MIN and MAX values and a selectable FAIL % that the user may set as desired. HOLE AREA parameter 645 refers to the acceptable area that each hole is allowed to exhibit. HOLE AREA parameter 645 includes selectable MIN and MAX values and a selectable FAIL % that the user may set as desired. HOLE COUNT 650 is the input parameter that refers to the number of holes that IHS 300 should detect in order to determine an acceptable filter. If the design for a particular filter includes 632 holes, then filter qualification IHS 300 should detect 632 holes. TOTAL AREA 655 is the input parameter that specifies the total cumulative area, with selectable MIN and MAX values, of all holes summed together that IHS 300 should detect in order to determine an acceptable filter. AVG DIAMETER 657 is the average diameter input parameter that specifies the average diameter of the holes in filter 115, with selectable MIN and MAX values. Different filters will have different values. For example, a filter with 769 holes may have an average of 375 microns with an allowed range of 325 to 425 microns. Another filter may have 632 holes and have holes that average 250 microns and an allowed range of 230 to 270 microns. QUALITY 660 is the input parameter that specifies the overall acceptable quality that a particular filter should exhibit to pass qualification. The quality parameter is computed from a combination of control limits including Sigma (the standard deviation of individual data points) divided by the square root of n (the sample size) multiplied by limits u. Each of parameters 640, 645, 650, 655 and 660 include respective check boxes to enable them so that these parameters may be selected or deselected as desired. In one embodiment, those parameters selected by a check in the respective check boxes are considered as criteria in the pass/fail decision, whereas unselected parameters are not consider as criteria in this decision.

MIN AREA LIMIT 665 is the input parameter that refers to the minimal allowable area that a hole should exhibit. The user may specify the number of allowable failures in the adjacent ALLOWED FAILURES box 667. MAX AREA LIMIT 670 is the input parameter that refers to the maximum allowable area that a hole should exhibit. The user may specify the number of allowable failures in the adjacent ALLOWED FAILURES box 672.

Figure 7A:
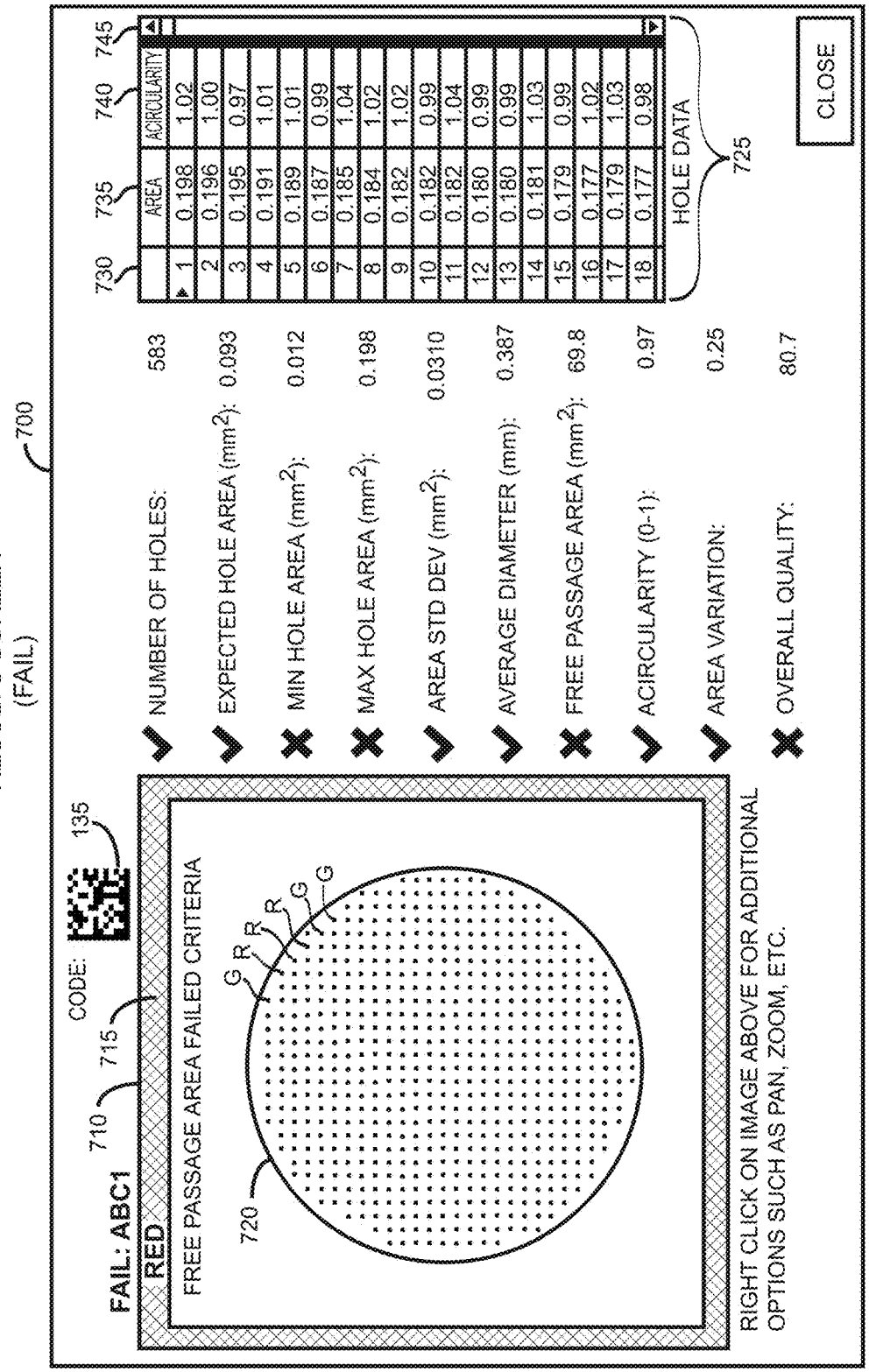
FIG. 7A is a screen shot of a results screen for a failing filter.

FIG. 7A is a screen shot of a results screen 700 that filter qualification IHS 300 may generate on display 340 when a particular filter ABC1 fails qualification testing, showing why the filter failed, which may include one or more criteria. Results screen 700 includes a reproduction of the unique 2 dimensional code 135 that is applied to each coffee filter 115 before qualification testing. Results screen 700 includes an image portion 710 including a margin 715 and the actual image 720 taken by imaging camera 225. Filter evaluation application 1100 marks each hole in the filter depicted in image 720 red (R) if it falls outside of specified filter criteria and green (G) if it the hole is within the specified filter criteria. The letters R and G are used to simulate red and green respectively for representative holes in image 720 of FIG. 7A for purposes of example. A legend at the bottom of image portion 710 instructs the user to click on the image for additional options such as pan and zoom.

Results screen 700 reports the NUMBER OF HOLES detected as 583, with the adjacent checkmark indicating that this number was within the input criteria. Results screen 700 also reported the EXPECTED HOLE AREA ($mm^2$) as 0.093, with the adjacent checkmark indicating that this number was within the input criteria. Results screen 700 further reported the MIN HOLE AREA ($mm^2$) as 0.012, with the adjacent "X" indicating that this number was not within the input criteria. Results screen 700 still further reported the MAX HOLE AREA ($mm^2$) as 0.198, with the adjacent "X" indicating that this number was not within the input criteria.

Results screen 700 reports the AREA STD DEV ($mm^2$), namely the area standard deviation, or spread values, as 0.0310, with the adjacent checkmark indicating that this number was within the input criteria. Results screen 700 reports the AVERAGE DIAMETER (mm), namely the average diameter of all of the holes, as 0.387 with the adjacent checkmark indicating that this number was within the input criteria. Results screen 700 also reports the FREE PASSAGE AREA ($mm^2$), namely the total cumulative area of all of the holes summed, as 69.8 with the adjacent "X" indicating that this number was not within the input criteria. Results screen 700 further reports the ACIRCULARITY (0-1), namely the average acircularity of the holes of the filter, as 0.97 with the adjacent checkmark indicating that this number was within the input criteria. Results screen 700 reports the AREA VARIATION, namely sigma/mu a method for evaluation area spread of large sets of data, as 0.25 with the adjacent checkmark indicating that this number was within the input criteria. Results screen 700 reports the OVERALL QUALITY as 80.7, with the adjacent "X" indicating that this number was not acceptable and that the particular filter is rejected.

The rightmost portion of results screen 700 depicts hole data 725 for each of the holes that filter evaluation application 1100 detected in filter ABC1. Hole data 725 includes a holes column 730 that lists each of the 583 holes detected in filter ABC1 by number from 1 to 583. Adjacent each hole's number is a respective AREA data value in AREA column 735 and a respective ACIRCULARITY data value in ACIRCULARITY column 740. A scroll bar 745 enables the user to scroll up and down to view the data for the holes 19-583 which are off-screen in the particular view depicted in FIG. 7A. Other hole data may be included, such as diameter, access by a horizontal scroll bar (not shown).

Figure 7B:
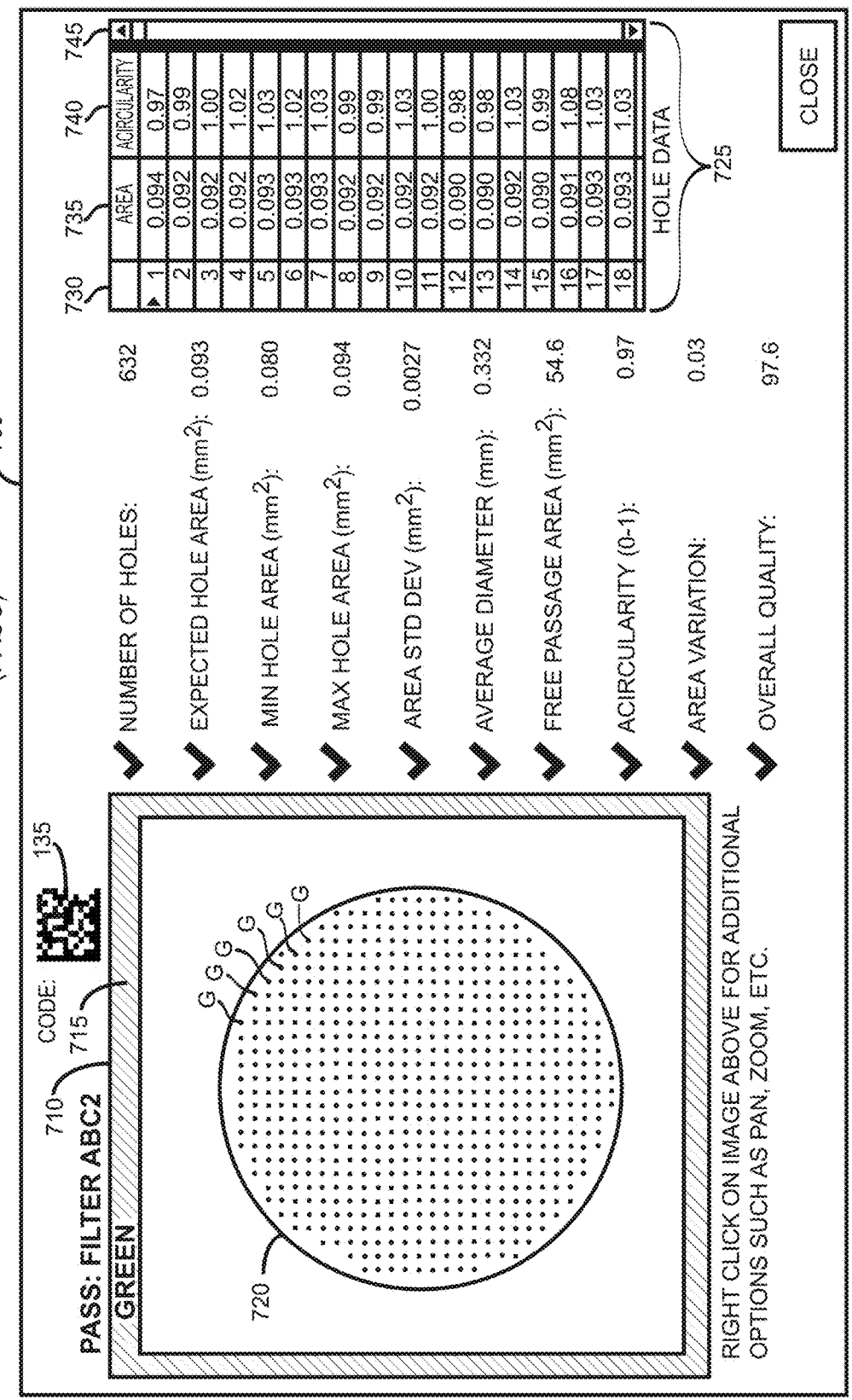
FIG. 7B is a screen shot of a results screen for a passing filter.

FIG. 7B is a screen shot of a results screen 700 that filter qualification IHS 300 may generate on display 340 when a different particular filter ABC2 passes qualification testing. In this example, the margin 715 of image portion 170 is green, thus indicating a PASSED filter. Results screen 700 again includes a reproduction of the unique 2 dimensional code 135 that is applied to each coffee filter 115 before qualification testing. The unique 2D code 135 of filter ABC2 of FIG. 7B is different from the unique 2D code 135 of filter ABC1 of FIG. 7A. Moreover, filter ABC2 of FIG. 7B is a different model filter with a different number of holes and different filter input criteria. Like numbers indicate like elements and constructs when comparing FIG. 7B with FIG. 7A. Filter evaluation application 1100 marks each hole in the filter depicted in image 720 red (R) if it falls outside of specified filter criteria and green (G) if it the hole is within the specified filter criteria. In the particular filter ABC2 shown in FIG. 7B, all holes are marked green as represented by the G's marked on image 720.

Results screen 700 reports the NUMBER OF HOLES detect as 632, with the adjacent checkmark indicating that this number was within the input criteria. Results screen 700 also reported the EXPECTED HOLE AREA ($mm^2$) as 0.093, with the adjacent checkmark indicating that this number was within the input criteria. Results screen 700 further reported the MIN HOLE AREA ($mm^2$) as 0.080, with the adjacent checkmark indicating that this number was within the input criteria. Results screen 700 still further reported the MAX HOLE AREA ($mm^2$) as 0.094, with the adjacent checkmark indicating that this number was within the input criteria.

Results screen 700 reports the AREA STD DEV ($mm^2$), namely the area standard deviation, as 0.0027, with the adjacent checkmark indicating that this number was within the input criteria. Results screen 700 reports the AVERAGE DIAMETER (mm), namely the average diameter of all of the holes, as 0.332 with the adjacent checkmark indicating that this number was within the input criteria. Results screen 700 also reports the FREE PASSAGE AREA ($mm^2$), namely the total cumulative area of all of the holes summed, as 54.6, with the adjacent checkmark indicating that this number was within the input criteria. Results screen 700 further reports the ACIRCULARITY (0-1), namely the average acircularity of the holes of the filter, as 0.97 with the adjacent checkmark indicating that this number was within the input criteria. Results screen 700 reports the AREA VARIATION as 0.03 with the adjacent checkmark indicating that this number was within the input criteria. Results screen 700 reports the OVERALL QUALITY as 97.6, with the adjacent checkmark indicating that this number was acceptable and that the particular filter is passed.

The rightmost portion of results screen 700 depicts hole data 725 for each of the holes that filter evaluation application 110 detected in filter ABC2. Hole data 725 includes holes column 730 that lists each of the 632 holes detected in filter ABC2 by number from 1 to 632. Adjacent each hole's number is an respective AREA data value in AREA column 735 and a respective ACIRCULARITY data value in ACIRCULARITY column 740. The scroll bar 745 enables the user to scroll up and down to view the data for the holes not see the data for holes 19-632 which are off-screen in the particular view depicted in FIG. 7B. Other hole data may be included, such as diameter, accessed by a horizontal scroll bar (not shown).

Figure 8A:
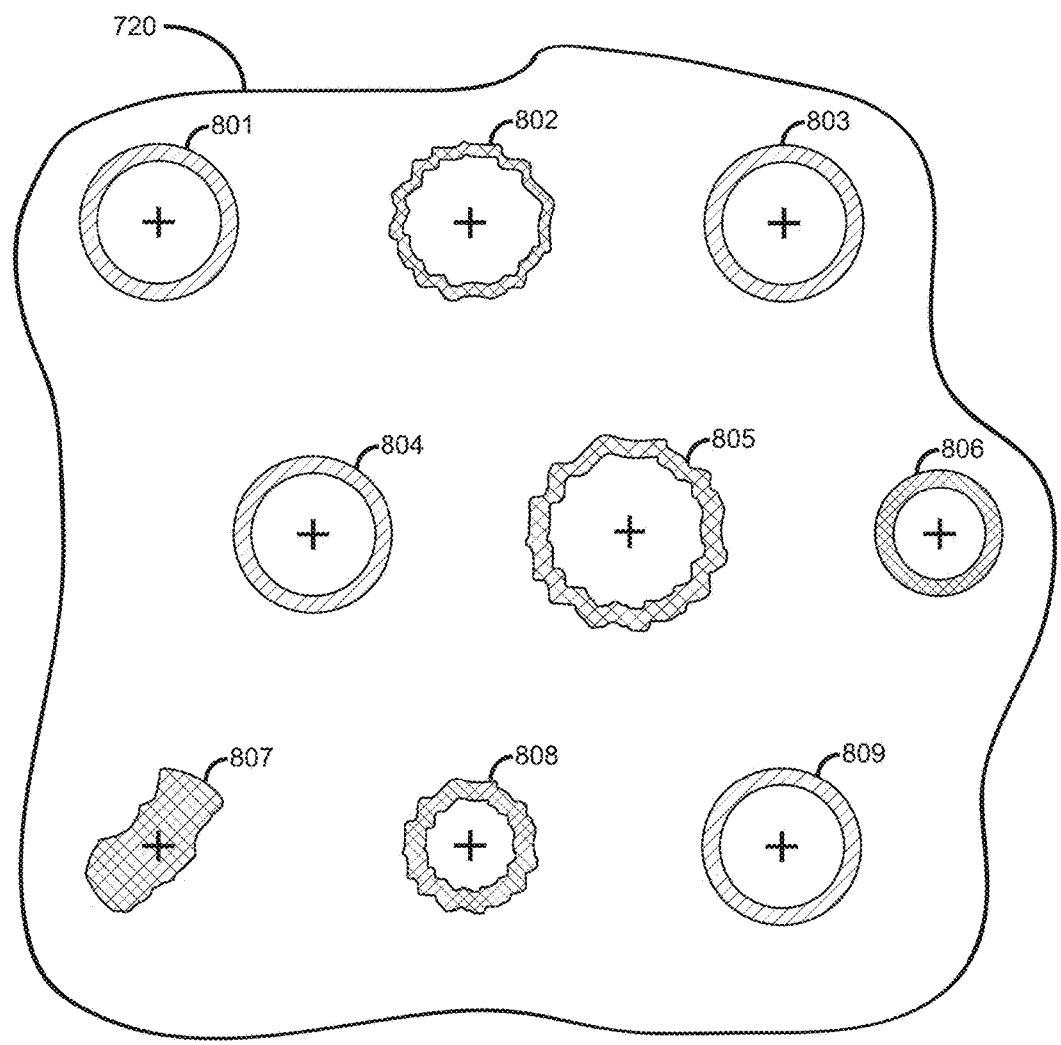
FIG. 8A is a zoomed-in view of the image of a failing filter that the disclosed filter evaluation application may generate for a filter.

FIG. 8A is a representation of a portion of the filter image seen on display 340 when the user elects to zoom in on filter 115 by selecting that option by right clicking or other action as indicated in FIG. 7A. Recalling that FIG. 7A depicts the filter FAIL scenario, when the user instructs filter evaluation application 1100 to zoom in on filter image 720, application 1100 generates an image such as shown in FIG. 8A. Filter evaluation application 1100 locates the center of each of the holes and places an X at each center, as seen in FIG. 8A. Filter evaluation application 1100 analyzes the digital image data received from camera 225 and determines the edge surface of each of the holes. Application 1100 marks the edges green following the outline of each hole, indicated by single hatching in FIG. 8A, if the hole is circular and meets input criteria.

However, if application 1100 determines that a particular hole does not meet input criteria, then it marks the edge of that hole red, as indicated by cross hatching, such as shown in FIG. 8A. In the particular example depicted, holes 801, 803, 804 and 809 are all circular and pass the input criteria. Thus, these holes are outlined in green (single hatching). However, hole 802 exhibits acircularity that is outside the specified input criteria and thus its irregular edge surface is marked in red (cross hatching) on display 340. Hole 805 is both too acircular and too large, and for these two reasons does not meet the specified input criteria. Thus, the edge surface of hole 805 is marked in red (cross hatching). While hole 806 meets the acircularity criteria, it is too small in diameter to pass the specified input criteria. For this reason, the edge surface of hole 806 is marked in red (cross hatching). Hole 807 is substantially occluded and meets neither acircularity nor hole area input criteria. Thus, the edge surface of hole 807 is marked in red (cross hatching). Hole 808 fails both acircularity and minimum hole size criteria. For this reason, the edge surface of hole 808 is marked in red (cross hatching) thus indicating its failure to pass.

Figure 8B:
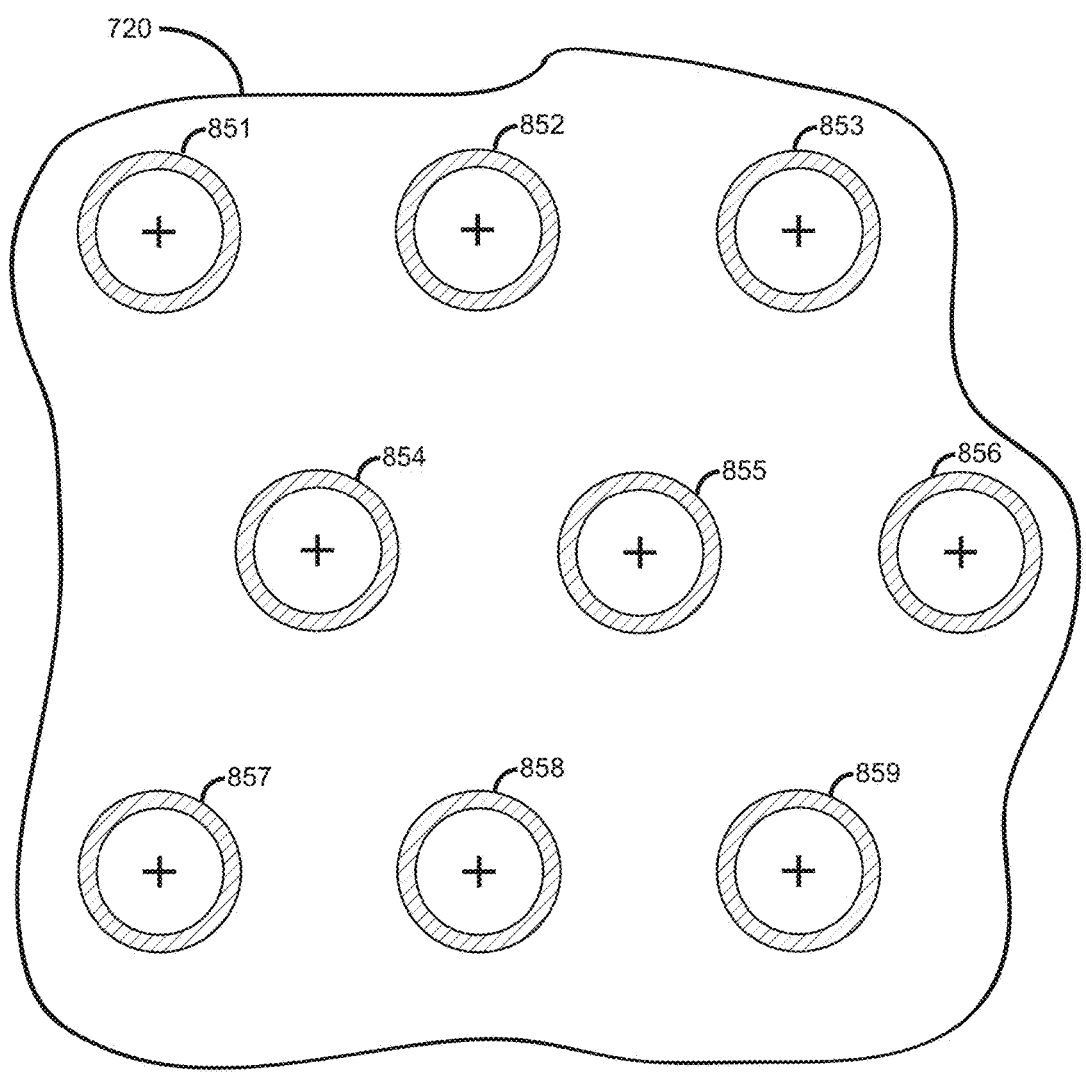
FIG. 8B is a zoomed-in view of the image of a passing filter that the disclosed filter evaluation application may generate for a filter.

FIG. 8B is a zoomed-in view similar to that of the failing filter of FIG. 7A, except that FIG. 8B depicts the passing filter of FIG. 7B. For this reason, filter qualification application 100 colors the edges of all of holes 851-859 of the filter of FIG. 8B green (single hatching) to indicate that all holes meet the specified input criteria.

Figure 9A:
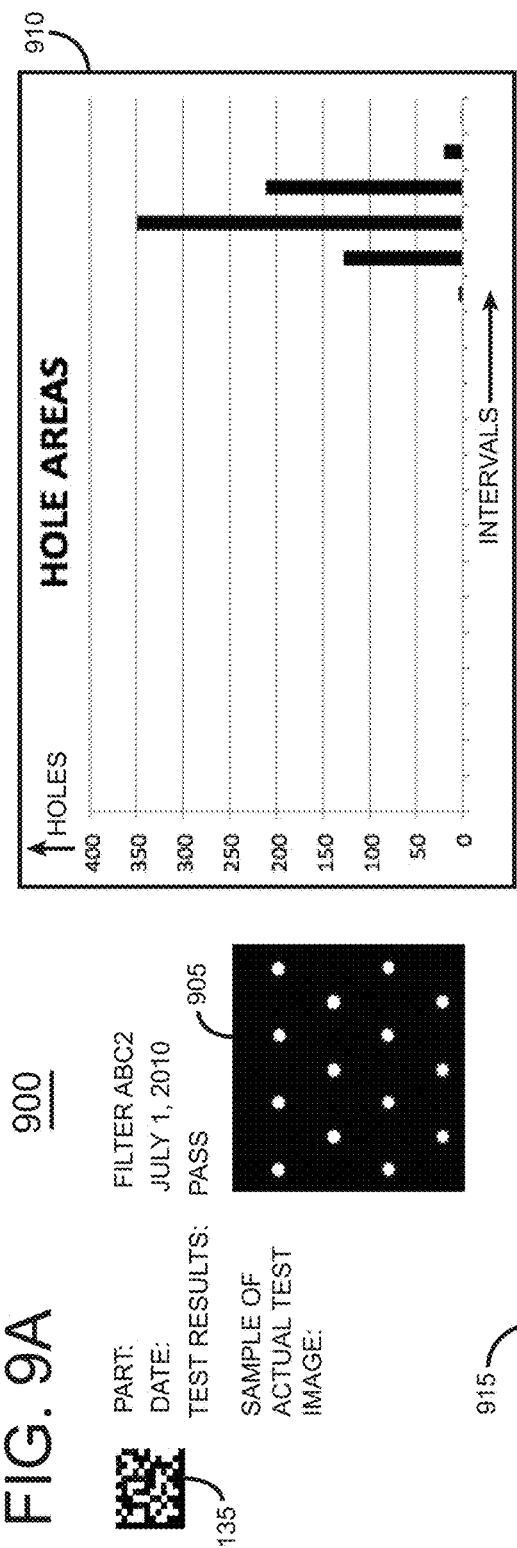
FIG. 9A is a representation of a summary report that accompanies a filter that passes the filter evaluation and qualification process.

FIG. 9A is a representation of a summary report 900 that accompanies a filter that passes the filter evaluation and qualification process. Summary report 900 includes the unique 2D code 135 that identifies the particular filter. Summary report 900 identifies this particular filter part as FILTER ABC2 and lists the test results as PASS adjacent 2D code 135. Summary report 900 also may include a sample of the actual test image 905 generated by filter qualification IHS 300. In one embodiment, summary report includes a hole area distribution histogram 910 that filter qualification application 1100 generates. The histogram shows the actual number of holes vs. class intervals, namely hole area ranges. In other words, histogram 910 depicts the number of holes in the filter that fall into different area ranges from small hole areas to large hole areas. A narrow distribution such as seen in histogram 910 is desirable and is one attribute of a passing filter. In addition, it provides a method of quickly and effective evaluating the quality of the tooling producing the parts, and can be set to thresholds that will indicate when such tools have deteriorated to the point they need to be replaced.

The summary report 900 of FIG. 9A also includes a chart 915 that depicts the selected input CRITERIA 925, namely attributes, and the resultant MEASURED results 930 as output. These attributes include hole count, acircularity, total area (cumulative area), hole area (individual hole area), overall quality, hole diameter, hole area minimum (min) and hole area maximum (max) as seen in attribute column 925.

Figure 9B:
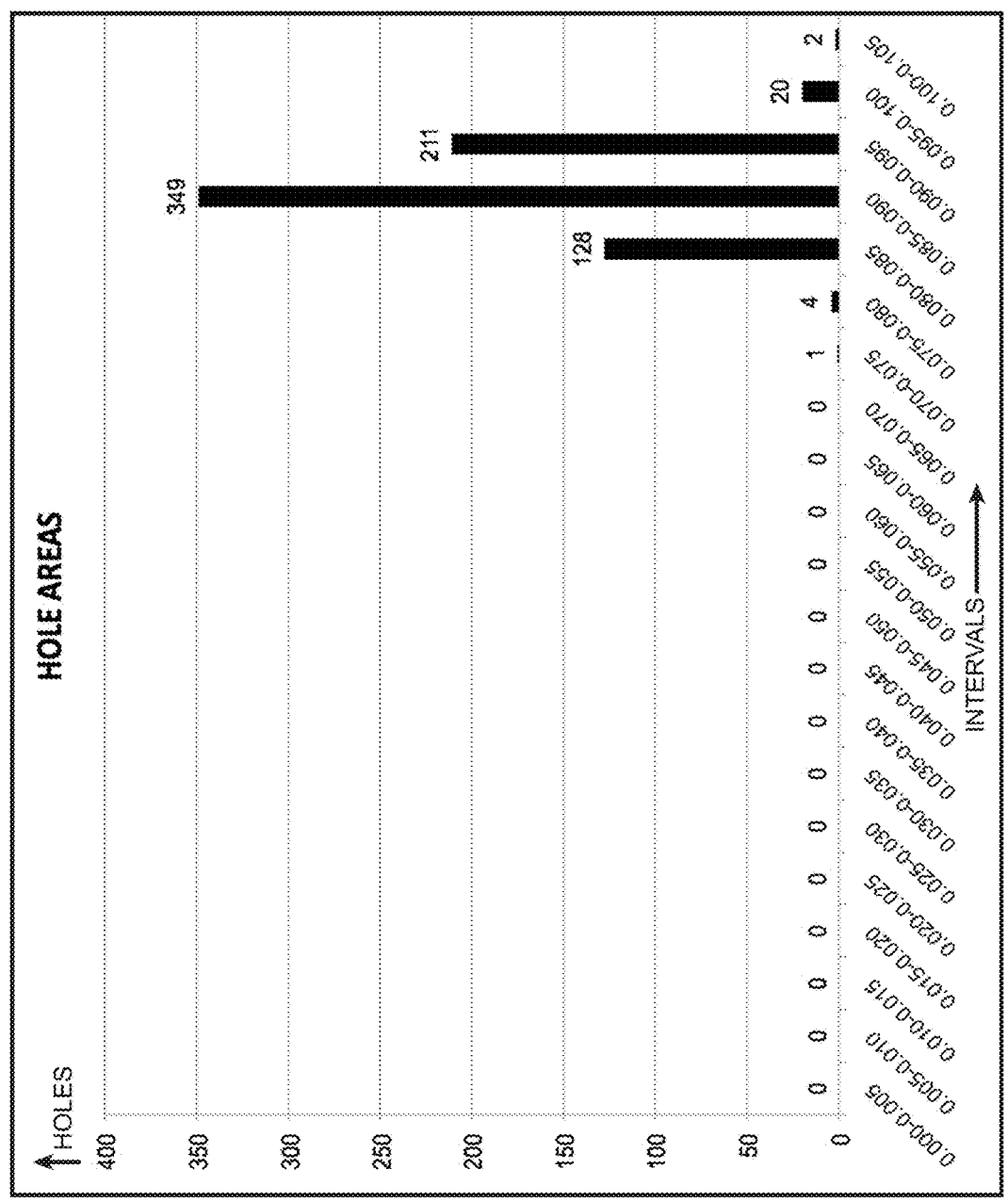
FIG. 9B shows additional information that may be added to the report of FIG. 9A to provide a more detailed report.

FIG. 9B includes a detailed hole area histogram that when added to the report of FIG. 9A and the hole data chart of FIG. 9C forms a detailed report that may be provided to the user or other entity. The histogram of FIG. 9B is similar to histogram 910 of FIG. 9A, except that the histogram of FIG. 9B shows the actual hole size ranges, i.e. class intervals, along the horizontal axis of the histogram. FIG. 9C is a chart which includes the actual raw data that filter qualification application 1100 uses to generate the detailed histogram of FIG. 9B. The data and distribution plots are applied using a statistical analysis rule for normally distributed data, following the central limit theorem that the distribution of a sum of many independent, identically distributed random variables will tend toward a Gaussian distribution with a probability density function, which can be used to evaluate the initial quality of the tooling as well as at what point the distribution begins to degrade and tooling should be replaced.

FIG. 10A is a top view of filter 115 looking down into the cup chamber that filter 115 forms. Holes such as hole 125 are visible in bottom 122 of filter 115. Filter 115 includes a rim 130 at top 132 and an array of holes 125 in bottom 122. Filter 115 includes a center 140 and an inner diameter 145. The portion of bottom surface 122 defined by inner diameter 145 is micro-machined to reduce the likelihood of undesired burrs forming in holes 125. FIG. 10B shows a perspective view of filter 115. FIG. 100 shows a close-up cut-away view of a representative hole or aperture 125 in the micro-machined bottom 122 of filter 115. In order to maintain structural integrity, material thickness of filter 115 is chosen such that final thickness post machining is greater than or equal to 0.50 mm in one particular embodiment. In addition, the straight section of the top hole diameter 125 is kept constant for 0.10 mm to eliminate wear migration of hole size.

Figure 11:
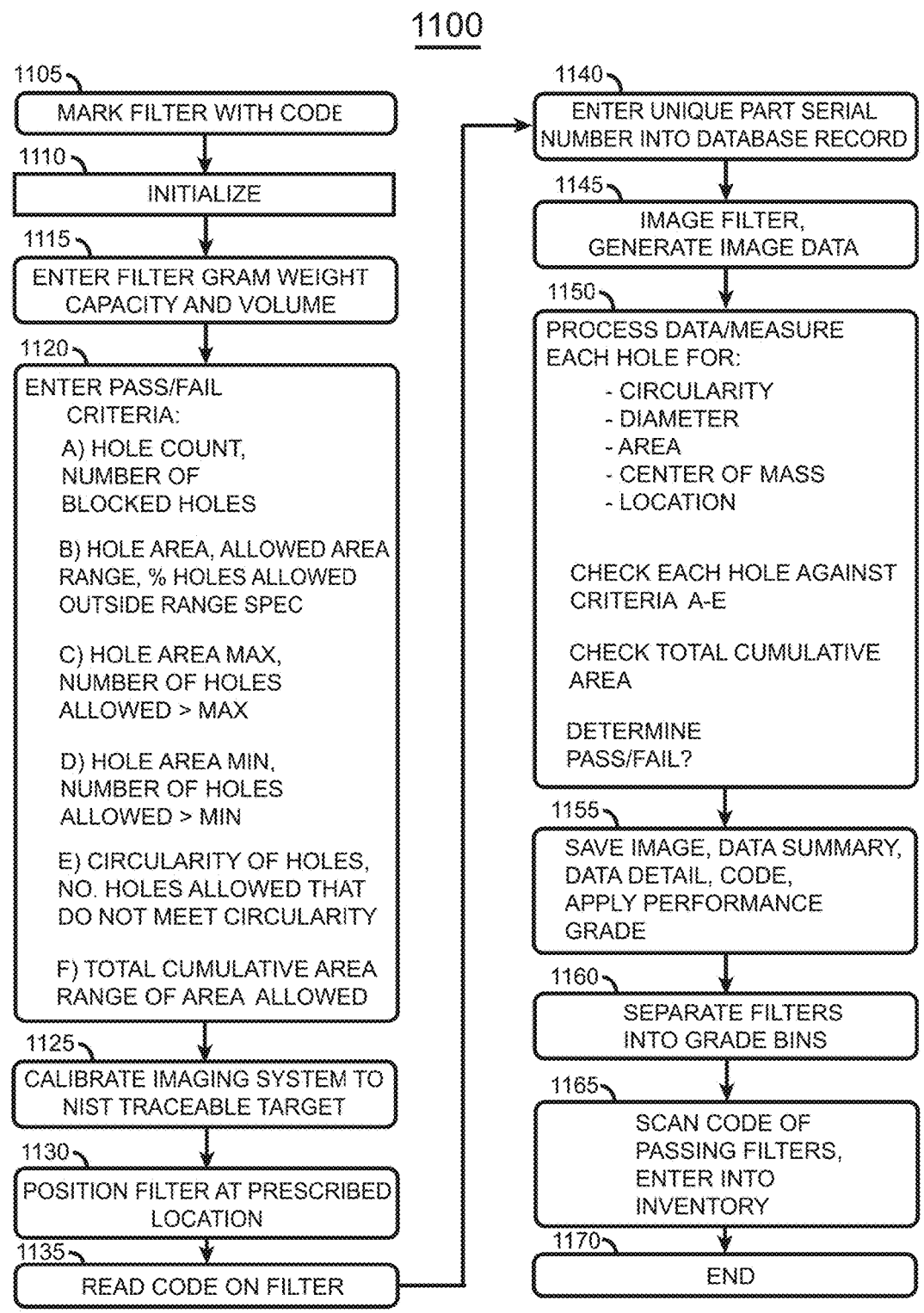
FIG. 11 is a flowchart that describes process flow in the disclosed liquid brewing filter qualification methodology.

FIG. 11 is a flowchart that depicts representative process flow in one embodiment of the filter qualification application 1100 of the disclosed filter qualifying system 100. FIG. 11 shows processes that filter evaluation application 1100 may implement. At some point in time before presenting coffee filter 115 for qualification, or presenting a batch of filters for qualification, all filters are marked with a unique code, as per block 1105. One code that may be used is an 18×18 2D code that is laser-drilled, or impact marked, into a metallic surface of coffee filter 115, such as shown in FIG. 1B as code 135.

In one embodiment, the code is a non-human readable code to discourage counterfeiting. In one embodiment, the code is supplemented with a human readable performance grade for matching into multiple group espresso machines or Multiple Super Automatic machines, for example, to maintain a corporate brewing protocol for a corporate retail chain deployment. In one embodiment, the marking performed in block 1150 may be performed independent of filter evaluation application 1100. The human readable performance grade is desirably permanently fixed to filter 115, or alternatively, may be in an accompanying report. The performance grade relates to the qualities of the filter such as hole diameter and total free surface area for example. Filters with the same or matching performance grades will perform similarly under similar brewing conditions. By observing the human-readable performance grade on each filter, the barista or other operator will be provided with a reasonable expectation of how the filter will perform. More importantly, using filters with like performance grades allows the barista to achieve a consistent shot to shot capability in a multi-head coffee machine wherein filters are frequently swapped from head to head. In prior non-graded filters, it is very likely that different filters will perform differently in a multi-head coffee machine leading to inconsistent brewing results and customer dissatisfaction. Using the same matching grade filter in each head of the multi-head coffee machine allows the barista or other user to achieve consistent brewing performance from each head of the machine.

Filter qualification IHS 300 is initialized, as per block 1110. A user or other entity enters the coffee filter gram weight capacity and volume for the particular filter type into application 1100, as per block 1115. The user or other entity enters pass/fail criteria, namely the desired filter input criteria into application 1100, as per block 1120. More specifically, the user may enter the following input criteria: A) hole count, number of blocked holes; B) hole area, allowed hole area range, % holes allowed outside of range specification; C) hole area maximum, number of holes allowed >maximum (max); D) hole area minimum, number of holes allowed <minimum (min); E) circularity of holes, number of holes that do not meet circularity, may also be expressed in terms of acircularity; and F) total cumulative area range of area allowed.

The user calibrates the imaging system to an National Institute of Standards and Technology (NIST) traceable target on optical bench 205, as per block 1125. The user positions filter 115 at the prescribed location on optical bench 205, as per block 1130. The filter may be positioned manually or, alternatively, via an automated feed system in a production environment. The user then reads the 2D code 135 on the particular filter under test, as per block 1135, using a 2D code reader such as the Cognex DataMan 7550 available from the Cognex Corporation in Natick, MA. The unique serial number corresponding to the particular filter's unique code 135 is entered into a database record for storage, as per block 1140. The filter is imaged or photographed at high resolution via sub-pixel machine vision camera 225, as per block 1145. IHS 300 stores the resultant image data for that particular filter in non-volatile storage 345. IHS 300, under the control of filter qualification application 1100, processes the image data, as per block 1150, and measures each hole of the filter for circularity (acircularity), diameter, area, center of mass and location. IHS 100 checks each detected hole against criteria A-E, described above, to see if the particular filter meets those criteria. IHS 100 also checks the particular filter to determine if it meets the total cumulative area criteria of criteria F. IHS 100 makes a pass/fail decision based on whether or not the filter meets the above criteria.

IHS 100 saves the image, the data summary report of FIG. 9A, and the detailed data report formed by combining the information of FIGS. 9A, 9B and 9C, in a database in nonvolatile storage 345 or other storage location, as per block 1155. Many filters can be processed in rapid accurate fashion using the described method. The filter may be assigned grades, for example A, B and C, depending on how well they meet the predetermined filter criteria. After evaluation, passed filters may be separated into grade bins, as per block 1160. The 2D code of those filters that pass qualification are scanned and stored, as per block 1165. The passing filters are entered into inventory. Process flow terminates at end block 1170.

As will be appreciated by one skilled in the art, aspects of the disclosed filter qualification methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, such as computer program product 375 embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIG. 11 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIG. 11 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIG. 11 described above.

The flowchart of FIG. 11 illustrate the architecture, functionality, and operation of possible implementations of systems, methods and computer program products that perform network analysis in accordance with various embodiments of the present invention. In this regard, each block in the flowchart FIG. 11 may represent a module, segment, or portion of code, which comprises one or more executable instructions for implementing the specified logical function(s). It should also be noted that, in some alternative implementations, the functions noted in the block may occur out of the order noted in FIG. 11. For example, two blocks shown in succession may, in fact, be executed substantially concurrently, or the blocks may sometimes be executed in the reverse order, depending upon the functionality involved. It will also be noted that each block of FIG. 11 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of qualifying coffee brewing filters, comprising:
    inputting, to a coffee filter qualification information handling system (IHS), coffee filter criteria relating to a plurality of apertures included in a bottom portion of a coffee brewing filter, wherein the coffee filter criteria includes the total cumulative area of the plurality of apertures in the bottom portion of the coffee brewing filter, wherein the coffee filter criteria further include area standard deviation of the plurality of apertures in the bottom portion of the coffee brewing filter;
    illuminating, by a light source, the plurality of apertures in the bottom portion of the coffee brewing filter;
    imaging, by a sub-pixel machine vision camera, the coffee brewing filter to generate digital image information that describes the plurality of apertures in the bottom portion of the coffee brewing filter;
    determining, by the filter qualification IHS, if the coffee brewing filter meets the coffee filter criteria, the determining including generating from the digital image information the total cumulative area of the plurality of apertures in the bottom portion of the coffee brewing filter and testing to determine if the total cumulative area of the plurality of apertures in the bottom portion of the coffee brewing filter is within a predetermined range of total cumulative areas, the determining further including generating, from the digital image information, the area standard deviation for the plurality of apertures in the bottom portion of the coffee brewing filter and testing to determine if the area standard deviation of the plurality of apertures meets the coffee filter criteria; and
    passing, by the coffee filter qualification IHS, the coffee brewing filter if the coffee brewing filter meets the coffee filter criteria, and otherwise failing the coffee brewing filter if the coffee brewing filter does not meet the coffee filter criteria.

2. The method of claim 1, wherein the illuminating comprises illuminating, by a common light source, all of the apertures of the plurality of apertures in the bottom portion of the coffee brewing filter.

3. The method of claim 1, wherein the coffee filter criteria include the area that individual apertures of the plurality of apertures exhibit.

4. The method of claim 1, wherein the coffee filter criteria include the acircularity that individual apertures of the plurality of apertures exhibit.

5. The method of claim 1, wherein the coffee filter criteria include an expected aperture count that indicates the expected number of individual apertures of the plurality of apertures in the bottom portion of a particular coffee brewing filter, the method further comprising determining an actual aperture count that indicates the total number of apertures actually present in the bottom portion of a particular coffee brewing filter, wherein the filter qualification IHS employs the actual aperture count and the expect aperture count to determine if the particular coffee brewing filter meets the coffee filter criteria.

6. The method of claim 1, further comprising generating, by the coffee filter qualification IHS, a report including coffee filter criteria compliance information that includes at least one of total cumulative area of the plurality of apertures and acircularity of the plurality of apertures, the report certifying that the coffee brewing filter conforms to the coffee filter criteria compliance information.

7. The method of claim 1, wherein the coffee filter criteria include an expected aperture area parameter that indicates the expected aperture area of the apertures of the plurality of apertures in the bottom portion of a particular coffee brewing filter, the method further comprising determining an actual aperture area of each of the apertures in the bottom portion of the particular coffee brewing filter, wherein the filter qualification IHS employs the expected aperture area and the actual aperture area of each of the apertures in the bottom portion of the particular coffee brewing filter to determine if the particular coffee brewing filter meets the coffee filter criteria.

8. The method of claim 1, wherein the coffee filter criteria includes a maximum aperture area allowed for each of the apertures of the plurality of apertures, wherein the coffee filter criteria further includes a minimum aperture area allowed for each of the apertures of the plurality of apertures.

9. The method of claim 1, further comprising marking, by a mark applicator, a unique marking code to the coffee brewing filter and a human readable coffee filter performance grade.

10. The method of claim 1, further comprising:
    reading, by a mark reader, the unique marking code of a particular coffee brewing filter; and
    retrieving, from a database, coffee filter information related to the particular coffee brewing filter.

11. The method of claim 1 further comprising:
    determining the individual areas of the apertures of the plurality of apertures, and summing the respective individual areas of the apertures of the plurality of apertures to determine the total cumulative area of the plurality of apertures.

12. The method of claim 1, wherein the filter criteria include an aperture count value of the expected number of apertures in the plurality of apertures.

13. The method of claim 1 wherein the coffee filter criteria include a minimum acceptable area limit and maximum acceptable area limit for the apertures of the plurality of apertures to be acceptable.

14. The method of claim 1, further comprising displaying a coffee filter image of the bottom of the coffee filter showing the plurality of apertures thereof, wherein each aperture that exhibits acceptable filter criteria is colored with a first predetermined color to indicate that such aperture passed the coffee filter criteria, and each aperture that exhibits failing coffee filter criteria is colored with a second predetermined color to indicate that such aperture failed to meet the coffee filter criteria.

15. The method of claim 1, displaying a coffee filter image of the bottom of the coffee filter showing the plurality of apertures thereof with a marker at respective centers of the apertures of the plurality of apertures.

16. The method of claim 1, wherein the apertures of the plurality of apertures include edge surfaces and the coffee filter criteria include aperture acircularity criteria, the method further including:
displaying the edge surfaces of first apertures of the plurality of apertures with a first predetermined color to indicate that the first apertures pass the coffee filter acircularity criteria; and
displaying the edge surfaces of second apertures of the plurality of apertures with a second predetermined color to indicate that the second apertures fail to meet the coffee filter acircularity criteria.

17. The method of claim 1, further comprising:
displaying a zoomed-in view of the particular filter when the particular filter fails to pass the coffee filter criteria, the zoomed-in view highlighting an edge surface of each passing aperture with a second predetermined color, and
alternatively displaying a zoomed-in view of a particular filter when the particular filter passes the coffee filter criteria, the zoomed-in view highlighting an edge surface of each passing aperture with a first predetermined color.

18. The method of claim 1 wherein the coffee filter criteria include an overall quality parameter.

19. The method of claim 1, further comprising:
inputting, to the coffee filter qualification system, an area bin size parameter that specifies an aperture class interval for evaluating a range of aperture sizes.

20. The method of claim 19, wherein the area bin size parameter represents aperture area.

21. The method of claim 19, wherein the area bin size parameter represents aperture diameter.

22. The method of claim 19, further comprising:
displaying, by the coffee filter qualification system, an aperture area distribution histogram that depicts the actual number of apertures vs. class intervals, thus displaying the number of apertures in the coffee filter that fall into different ranges from small area apertures to large area apertures.

23. A coffee brewing filter qualifying system, comprising:
a coffee filter qualification information handling system (IHS) that receives coffee filter criteria relating to a plurality of apertures included in a bottom portion of a coffee brewing filter, wherein the coffee filter criteria includes the total cumulative area of the plurality of apertures in the bottom portion of the coffee brewing filter, wherein the coffee filter criteria further include area standard deviation of the plurality of apertures in the bottom portion of the coffee brewing filter;
a light source that illuminates the plurality of apertures in the bottom portion of the coffee brewing filter;
a sub-pixel machine vision camera, coupled to the coffee filter qualification IHS, that images the coffee brewing filter to generate digital image information that describes the plurality of apertures of the in the bottom portion of the coffee brewing filter; and
wherein the coffee filter qualification IHS determines if the coffee brewing filter meets the coffee filter criteria by generating from the digital image information the total cumulative area of the plurality of apertures in the bottom portion of the coffee brewing filter and testing to determine if the total cumulative area of the plurality of apertures in the bottom portion of the coffee brewing filter is within a predetermined range of total cumulative areas, and the coffee filter qualification IHS determines if the coffee brewing filter meets the coffee filter criteria by further generating from the digital image information the area standard deviation for the plurality of apertures in the bottom portion of the coffee brewing filter and testing to determine if the area standard deviation of the plurality of apertures meets the coffee filter criteria, and
wherein the coffee filter qualification IHS passes the coffee brewing filter if the coffee brewing filter meets the coffee filter criteria, and wherein the coffee filter qualification system otherwise fails the coffee brewing filter if the coffee brewing filter does not meet the coffee filter criteria.

24. The coffee brewing filter qualifying system of claim 23, wherein the light source illuminates all of the apertures of the plurality of apertures.

25. The brewing coffee qualifying system of claim 23, wherein the coffee filter criteria include the area that individual apertures of the plurality of apertures exhibit.

26. The coffee brewing filter qualifying system of claim 23, wherein the coffee filter criteria include the acircularity that individual apertures of the plurality of apertures exhibit.

27. The coffee brewing filter qualifying system of claim 23, wherein the coffee filter criteria include an expected aperture count that indicates the expected number of individual apertures of the plurality of apertures in the bottom portion of a particular coffee brewing filter, wherein the filter qualification IHS determines an actual aperture count that indicates the total number of apertures actually present in the bottom portion of a particular coffee brewing filter, wherein the filter qualification IHS employs the actual aperture count and the expect aperture count to determine if the particular coffee brewing filter meets the coffee filter criteria.

28. The coffee brewing filter qualifying system of claim 23, wherein the coffee filter qualification IHS generates a report including filter criteria compliance information that includes at least one of total cumulative area of the plurality of apertures and acircularity of the plurality of apertures, the report certifying that the coffee brewing filter conforms to the filter criteria compliance information.

29. The coffee brewing filter qualifying system of claim 23, wherein the coffee filter criteria include an expected aperture area parameter that indicates the expected aperture area of the apertures of the plurality of apertures in the bottom portion of a particular coffee brewing filter, the method further comprising determining an actual aperture area of each of the apertures in the bottom portion of the particular coffee brewing filter, wherein the filter qualification IHS employs the expected aperture area and the actual aperture area of each of the apertures in the bottom portion of the particular coffee brewing filter to determine if the particular coffee brewing filter meets the coffee filter criteria.

30. The coffee brewing filter qualifying system of claim 23, wherein the coffee filter criteria include a maximum aperture area allowed for each of the apertures of the plurality of apertures, wherein the coffee filter criteria further includes a minimum aperture area allowed for each of the apertures of the plurality of apertures.

31. The coffee brewing filter qualifying system of claim 23, wherein the coffee filter qualification IHS includes a mark applicator that applies a unique marking code to the coffee brewing filter.

32. The coffee brewing filter qualifying system of claim 31, wherein the coffee filter qualification IHS includes a mark reader that reads the unique marking code of a particular coffee brewing filter, wherein the coffee filter qualification IHS retrieves from a database coffee filter information related to the particular coffee brewing filter.

33. The coffee brewing filter qualifying system of claim 23 wherein the system sums the respective areas of the apertures of the plurality of apertures to determine the total cumulative area of the plurality of apertures.

34. The coffee brewing filter qualifying system of claim 23 wherein the coffee filter criteria include an aperture count value of the expected number of apertures in the plurality of apertures.

35. The coffee brewing filter qualifying system of claim 23 wherein the coffee filter criteria include a minimum acceptable area limit and maximum acceptable area limit for the apertures of the plurality of apertures to be acceptable.

36. The coffee brewing filter qualifying system of claim 23, further comprising a display that displays a coffee filter image of the bottom of the coffee filter showing the plurality of apertures thereof, wherein each aperture that exhibits acceptable filter criteria is colored with a first predetermined color to indicate that such aperture passed the coffee filter criteria, and each aperture that exhibits failing coffee filter criteria is colored with a second predetermined color to indicate that such aperture failed to meet the coffee filter criteria.

37. The coffee brewing filter qualifying system of claim 23, further comprising a display that displays a coffee filter image of the bottom of the coffee filter showing the plurality of apertures thereof with a marker at respective centers of the apertures of the plurality of apertures.

38. The coffee brewing filter qualifying system of claim 23, wherein the apertures of the plurality of apertures include edge surfaces and the coffee filter criteria include coffee filter aperture acircularity criteria, wherein the display displays the edge surfaces of first apertures of the plurality of apertures with a first predetermined color to indicate that the first apertures pass the coffee filter aperture acircularity criteria, and the display displays the edge surfaces of second apertures of the plurality of apertures with a second predetermined color to indicate that the second apertures fail to meet the coffee filter aperture acircularity criteria.

39. The coffee brewing filter qualifying system of claim 23, further comprising:
a display that displays a zoomed-in view of the particular filter when the particular filter fails to pass the coffee filter criteria, the zoomed-in view highlighting an edge surface of each passing aperture with a second predetermined color, and that alternatively displaying a zoomed-in view of a particular filter when the particular filter passes the coffee filter criteria, the zoomed-in view highlighting an edge surface of each passing aperture with a first predetermined color.

40. The coffee brewing filter qualifying system of claim 23 wherein the filter criteria includes a quality parameter.

41. A method of qualifying coffee brewing filters, comprising:
inputting, to a coffee filter qualification information handling system (IHS), coffee filter criteria relating to a plurality of apertures included in a bottom portion of a coffee brewing filter, wherein the coffee filter criteria includes the total cumulative area of the plurality of apertures in the bottom portion of the coffee brewing filter, wherein the coffee filter criteria further include the average diameter of the plurality of apertures in the bottom portion of the coffee brewing filter;
illuminating, by a light source, the plurality of apertures in the bottom portion of the coffee brewing filter;
imaging, by a sub-pixel machine vision camera, the coffee brewing filter to generate digital image information that describes the plurality of apertures in the bottom portion of the coffee brewing filter;
determining, by the filter qualification IHS, if the coffee brewing filter meets the coffee filter criteria, the determining including:
generating from the digital image information the total cumulative area and average diameter of the plurality of apertures in the bottom portion of the coffee brewing filter; and
testing to determine if the total cumulative area of the plurality of apertures in the bottom portion of the coffee brewing filter is within a predetermined range of total cumulative areas, and
testing to determine if the average diameter of the plurality of apertures is within a predetermined range of average diameters;
passing, by the coffee filter qualification IHS, the coffee brewing filter if the coffee brewing filter meets the coffee filter criteria, and otherwise failing the coffee brewing filter if the coffee brewing filter does not meet the coffee filter criteria.

42. The method of claim 41, wherein the predetermined range of average diameters includes a minimum average diameter and a maximum average diameter.

43. The method of claim 41, further comprising:
inputting, to the coffee filter qualification system, an area bin size parameter that specifies an aperture class interval for evaluating a range of aperture sizes.

44. The method of claim 43, wherein the area bin size parameter represents aperture area.

45. The method of claim 43, wherein the area bin size parameter represents aperture diameter.

46. The method of claim 43, further comprising:
displaying, by the coffee filter qualification system, an aperture area distribution histogram that depicts the actual number of apertures vs. class intervals, thus displaying the number of apertures in the coffee filter that fall into different ranges from small area apertures to large area apertures.

* * * * *